United States Patent
Chang et al.

(10) Patent No.: US 9,676,288 B2
(45) Date of Patent: Jun. 13, 2017

(54) BATTERY OPEN-CIRCUIT VOLTAGE MEASUREMENT USING REVERSE CURRENT PULSE

(71) Applicant: Ford Global Technologies, LLC, Dearborn, MI (US)

(72) Inventors: Xiaoguang Chang, Northville, MI (US); Xu Wang, Dearborn, MI (US); Szushen Ho, Plymouth, MI (US); Chuan He, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 166 days.

(21) Appl. No.: 14/664,343

(22) Filed: Mar. 20, 2015

(65) Prior Publication Data

US 2016/0272080 A1   Sep. 22, 2016

(51) Int. Cl.
*H01M 10/46* (2006.01)
*B60L 11/18* (2006.01)
*H02J 7/00* (2006.01)

(52) U.S. Cl.
CPC ....... *B60L 11/1861* (2013.01); *B60L 11/1838* (2013.01); *H02J 7/0047* (2013.01); *H02J 2007/005* (2013.01); *Y02T 10/7005* (2013.01); *Y02T 10/7022* (2013.01); *Y02T 90/14* (2013.01)

(58) Field of Classification Search
CPC ........ H02J 7/0021; H02J 7/0047; H02J 7/007; H02J 7/0075; H02J 7/0091
USPC ....... 320/107, 127, 128, 130, 131, 132, 139, 320/141, 150
See application file for complete search history.

(56) References Cited

U.S. PATENT DOCUMENTS

| | | | |
|---|---|---|---|
| 3,857,087 A * | 12/1974 | Jones | G01R 31/3668 320/130 |
| 5,710,506 A | 1/1998 | Broell et al. | |
| 5,998,968 A | 12/1999 | Pittman et al. | |
| 6,232,750 B1 * | 5/2001 | Podrazhansky | H02J 7/0093 320/139 |
| 6,646,419 B1 * | 11/2003 | Ying | G01R 31/3668 320/132 |
| 7,449,862 B1 | 11/2008 | Voor et al. | |
| 7,932,702 B1 | 4/2011 | Patino et al. | |
| 8,447,544 B2 * | 5/2013 | Hsu | G01R 31/3651 320/134 |
| 8,645,088 B2 | 2/2014 | Schaefer et al. | |
| 2004/0219399 A1 * | 11/2004 | Zhu | B60L 11/1887 429/431 |
| 2012/0105013 A1 | 5/2012 | Lin et al. | |

(Continued)

FOREIGN PATENT DOCUMENTS

DE    102010017504 A1   12/2011
WO    2014191794 A1   12/2014

*Primary Examiner* — Edward Tso
(74) *Attorney, Agent, or Firm* — David Kelley; Brooks Kushman

(57) ABSTRACT

A battery management system for a vehicle includes a controller programmed to apply a current pulse to reverse a current flow through a battery to reduce or remove cell polarization. After the current pulse, an open-circuit voltage is measured as the terminal voltage of the battery. The settling time for the terminal voltage to approach the open-circuit voltage is reduced after the current pulse. The magnitude of the current pulse is based on a battery state of charge, a battery temperature, and a current magnitude prior to the current pulse.

19 Claims, 4 Drawing Sheets

(56) References Cited

U.S. PATENT DOCUMENTS

| | | |
|---|---|---|
| 2013/0185008 A1 | 7/2013 | Itabashi et al. |
| 2013/0314042 A1 | 11/2013 | Boehm et al. |
| 2014/0253023 A1 | 9/2014 | Paryani et al. |
| 2014/0333317 A1 | 11/2014 | Frost et al. |
| 2014/0375275 A1* | 12/2014 | Hung ............... B60L 3/003 320/139 |

* cited by examiner

BATTERY OPEN-CIRCUIT VOLTAGE MEASUREMENT USING REVERSE CURRENT PULSE

TECHNICAL FIELD

This application is generally related to open-circuit voltage measurement for traction batteries in a vehicle.

BACKGROUND

Hybrid and electric vehicle utilize a traction battery to provide power for propulsion and accessory loads. During operation, a state of charge (SOC) of the battery changes as the traction battery is charged and discharged. The SOC may be monitored to ensure that the SOC remains within acceptable limits. Operating the traction battery outside of the acceptable SOC limits may affect battery life. The SOC value may be used to determine when to operate the traction battery in a charging or discharging mode.

SUMMARY

A battery management system includes a controller programmed to, in response to a request to measure an open-circuit voltage of a battery in a presence of conditions indicative of a terminal voltage of the battery and the open-circuit voltage being different, apply a current pulse to reverse a current flow in the battery followed by a rest period such that cell polarization of the battery is reduced. The conditions may include charging the battery for greater than a predetermined time and discharging the battery for greater than a predetermined time. The controller may be further programmed to estimate a state of charge of the battery based on the terminal voltage.

A vehicle includes a battery including cells that acquire a cell polarization when a current flows through the battery such that an open-circuit voltage of the battery and a terminal voltage of the battery are different. The vehicle further includes a controller programmed to, in response to a request to measure the open-circuit voltage of the battery, apply a current pulse to reverse the current followed by a rest period to reduce the cell polarization. The controller may be further programmed to filter measured values of the current to generate a magnitude of the current pulse such that the magnitude increases as a current magnitude increases and increases as a current duration increases.

A method includes reversing, by a controller, a current through a battery according to a current pulse profile to reduce cell polarization followed by a rest period, in response to a state of charge request of the battery. The method further includes outputting, by the controller, the state of charge for the battery based on a measurement of a terminal voltage of the battery taken after a rest period.

The rest period may be defined by a time period of approximately zero current. The magnitude of the current pulse may be based on one or more of a state of charge of the battery, a temperature of the battery, and a magnitude of current flowing through the battery prior to reversing the current. The duration of the current pulse may be predetermined.

The request to measure the open-circuit voltage may be in response to an error of a state of charge being greater than a predetermined error magnitude or an elapsed time from an immediately preceding request being greater than a predetermined period of time.

The current pulse may be a charge current pulse when the current flows from the battery prior to reversing the current. The current pulse may be a discharge current pulse when the current flows to the battery prior to reversing the current.

The configurations disclosed herein allow for more accurate state of charge estimations while the battery is operated. The current pulse may be commanded to reduce or remove cell polarization effects to allow the open-circuit voltage and terminal voltage to converge. The terminal voltage after this process may be considered to be equal to the open-circuit voltage. This permits more frequent measurements of the open-circuit voltage which allows a more accurate state of charge estimation.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
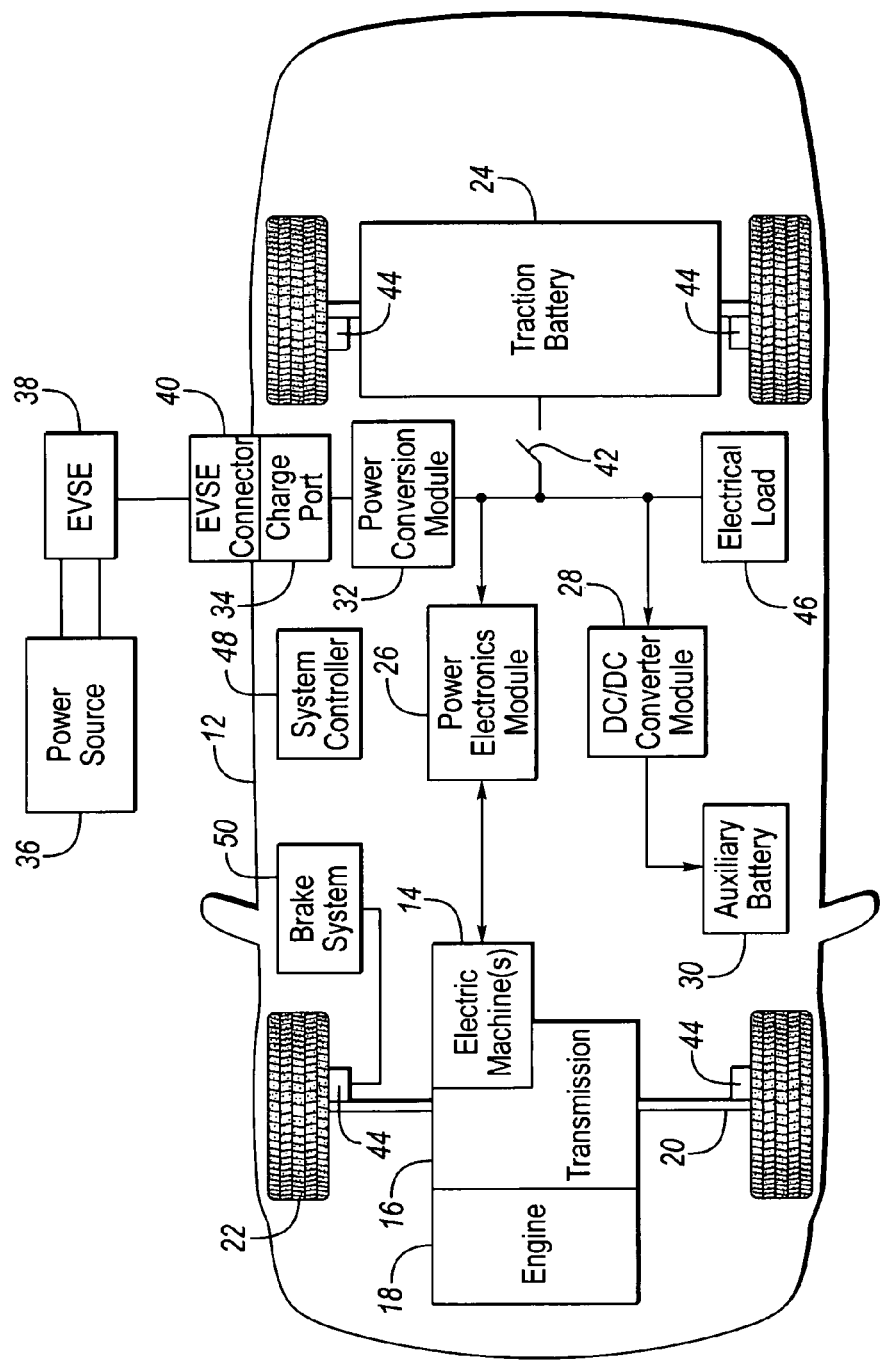
FIG. 1 is a diagram of a hybrid vehicle illustrating typical drivetrain and energy storage components.

FIG. 1 depicts a typical plug-in hybrid-electric vehicle (PHEV). A typical plug-in hybrid-electric vehicle 12 may comprise one or more electric machines 14 mechanically coupled to a hybrid transmission 16. The electric machines 14 may be capable of operating as a motor or a generator. In addition, the hybrid transmission 16 is mechanically coupled to an engine 18. The hybrid transmission 16 is also mechanically coupled to a drive shaft 20 that is mechanically coupled to the wheels 22. The electric machines 14 can provide propulsion and deceleration capability when the engine 18 is turned on or off. The electric machines 14 also act as generators and can provide fuel economy benefits by recovering energy that would normally be lost as heat in a friction braking system. The electric machines 14 may also reduce vehicle emissions by allowing the engine 18 to operate at more efficient speeds and allowing the hybrid-electric vehicle 12 to be operated in electric mode with the engine 18 off under certain conditions.

A traction battery or battery pack 24 stores energy that can be used by the electric machines 14. A vehicle battery pack 24 typically provides a high-voltage direct current (DC) output. The traction battery 24 is electrically coupled to one or more power electronics modules. One or more contactors 42 may isolate the traction battery 24 from other components when opened and connect the traction battery 24 to other components when closed. The power electronics module 26 is also electrically coupled to the electric machines 14 and provides the ability to bi-directionally transfer energy between the traction battery 24 and the electric machines 14. For example, a traction battery 24 may provide a DC voltage while the electric machines 14 may operate with a three-phase alternating current (AC) to function. The power electronics module 26 may convert the DC voltage to a three-phase AC current to operate the electric machines 14. In a regenerative mode, the power electronics module 26 may convert the three-phase AC current from the electric machines 14 acting as generators to the DC voltage compatible with the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A vehicle 12 may include a DC/DC converter module 28 that converts the high voltage DC output of the traction battery 24 to a low voltage DC supply that is compatible with low-voltage vehicle loads. An output of the DC/DC converter module 28 may be electrically coupled to an auxiliary battery 30 (e.g., 12V battery). The low-voltage systems may be electrically coupled to the auxiliary battery. Other high-voltage loads 46, such as compressors and electric heaters, may be coupled to the high-voltage output of the traction battery 24.

The vehicle 12 may be an electric vehicle or a plug-in hybrid vehicle in which the traction battery 24 may be recharged by an external power source 36. The external power source 36 may be a connection to an electrical outlet. The external power source 36 may be electrically coupled to a charger or electric vehicle supply equipment (EVSE) 38. The external power source 36 may be an electrical power distribution network or grid as provided by an electric utility company. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically coupled to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically coupled or connected may transfer power using a wireless inductive coupling.

One or more wheel brakes 44 may be provided for decelerating the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components to operate the wheel brakes 44. For simplicity, the figure depicts a single connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 for vehicle deceleration. The brake system 50 may respond to driver commands via a brake pedal and may also operate autonomously to implement features such as stability control. The controller of the brake system 50 may implement a method of applying a requested brake force when requested by another controller or sub-function.

One or more electrical loads 46 may be coupled to the high-voltage bus. The electrical loads 46 may have an associated controller that operates and controls the electrical loads 46 when appropriate. Examples of electrical loads 46 may be a heating module or an air-conditioning module.

The various components discussed may have one or more associated controllers to control and monitor the operation of the components. The controllers may communicate via a serial bus (e.g., Controller Area Network (CAN)) or via discrete conductors. In addition, a system controller 48 may be present to coordinate the operation of the various components.

Figure 2:
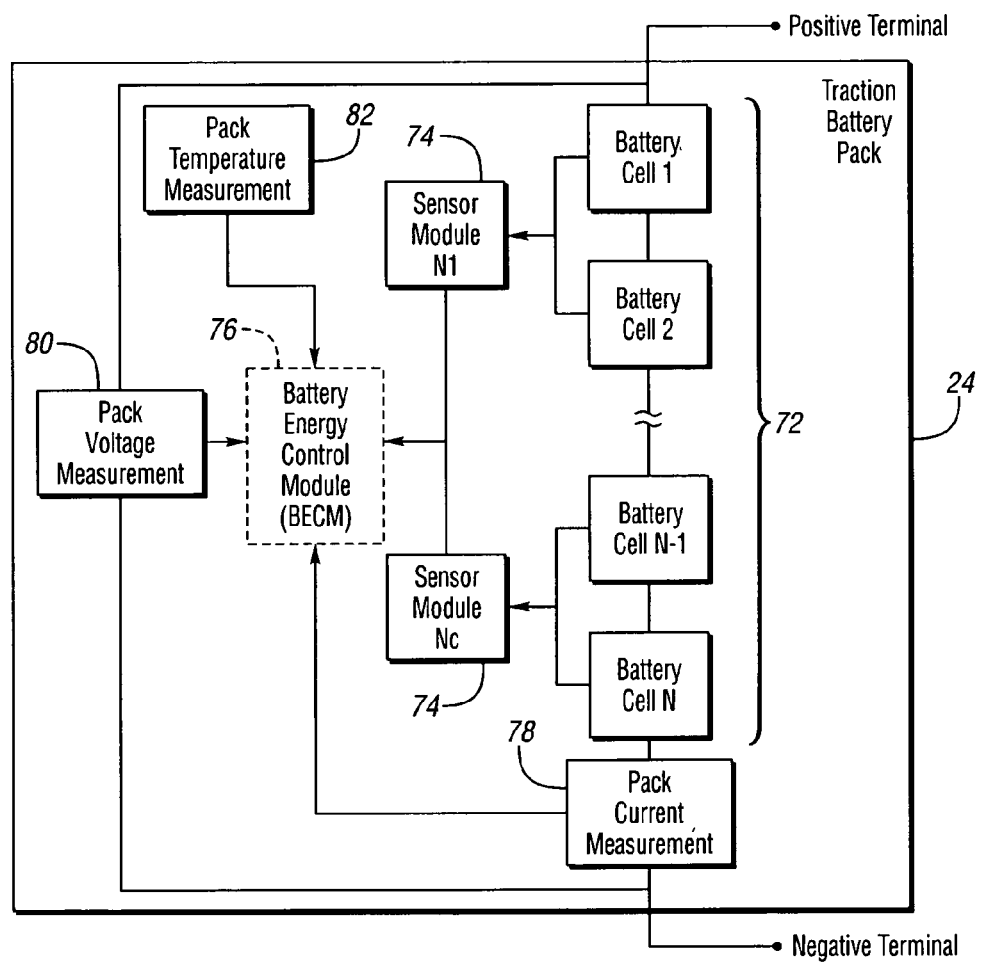
FIG. 2 is a diagram of a possible battery pack arrangement comprised of multiple cells, and monitored and controlled by a Battery Energy Control Module.

A traction battery 24 may be constructed from a variety of chemical formulations. Typical battery pack chemistries may be lead acid, nickel-metal hydride (NIMH) or Lithium-Ion. FIG. 2 shows a typical traction battery pack 24 in a simple series configuration of N battery cells 72. Other battery packs 24, however, may be composed of any number of individual battery cells connected in series or parallel or some combination thereof. A battery management system may have a one or more controllers, such as a Battery Energy Control Module (BECM) 76, that monitor and control the performance of the traction battery 24. The battery pack 24 may include sensors to measure various pack level characteristics. The battery pack 24 may include one or more pack current measurement sensors 78, pack voltage measurement sensors 80, and pack temperature measurement sensors 82. The BECM 76 may include circuitry to interface with the pack current sensors 78, the pack voltage sensors 80 and the pack temperature sensors 82. The BECM 76 may have non-volatile memory such that data may be retained when the BECM 76 is in an off condition. Retained data may be available upon the next key cycle.

In addition to the pack level characteristics, there may be battery cell 72 level characteristics that are measured and monitored. For example, the terminal voltage, current, and temperature of each cell 72 may be measured. A system may use a sensor module 74 to measure the battery cell 72 characteristics. Depending on the capabilities, the sensor module 74 may measure the characteristics of one or multiple of the battery cells 72. The battery pack 24 may utilize up to N, sensor modules 74 to measure the characteristics of all the battery cells 72. Each sensor module 74 may transfer the measurements to the BECM 76 for further processing and coordination. The sensor module 74 may transfer signals in analog or digital form to the BECM 76. In some configurations, the sensor module 74 functionality may be incorporated internally to the BECM 76. That is, the sensor module 74 hardware may be integrated as part of the circuitry in the BECM 76 and the BECM 76 may handle the processing of raw signals. The BECM 76 may also include circuitry to interface with the one or more contactors 42 to open and close the contactors 42.

It may be useful to calculate various characteristics of the battery pack. Quantities such as battery power capability and battery state of charge may be useful for controlling the operation of the battery pack 24 as well as any electrical loads receiving power from the battery pack. Battery power capability is a measure of the maximum amount of power the battery 24 can provide or the maximum amount of power that the battery 24 can receive. Knowing the battery power capability allows the electrical loads to be managed such that the power requested is within limits that the battery 24 can handle.

Battery pack state of charge (SOC) gives an indication of how much charge remains in the battery pack. The SOC may be expressed as a percentage of the total charge remaining in the battery pack. The battery pack SOC may be output to inform the driver of how much charge remains in the battery pack, similar to a fuel gauge. The battery pack SOC may also be used to control the mode of operation of the electric or hybrid-electric powertrain. Calculation of battery pack SOC can be accomplished by a variety of methods. One possible method of calculating battery SOC is to perform an integration of the battery pack current over time. This is well-known in the art as ampere-hour integration.

The traction battery 24 may operate in a charging mode and a discharging mode. In the charging mode, the traction battery 24 accepts charge and the state of charge of the battery 24 may increase. Stated another way, in the charging mode, current flows into the traction battery 24 to increase the charge stored in the battery 24. In the discharging mode, the traction battery 24 depletes charge and the state of charge of the battery 24 may decrease. Stated another way, in the discharging mode, current flows from the traction battery 24 to decrease the charge stored in the battery 24. During operation of the vehicle, the traction battery 24 may be operated in alternating cycles of charging and discharging.

Figure 3:
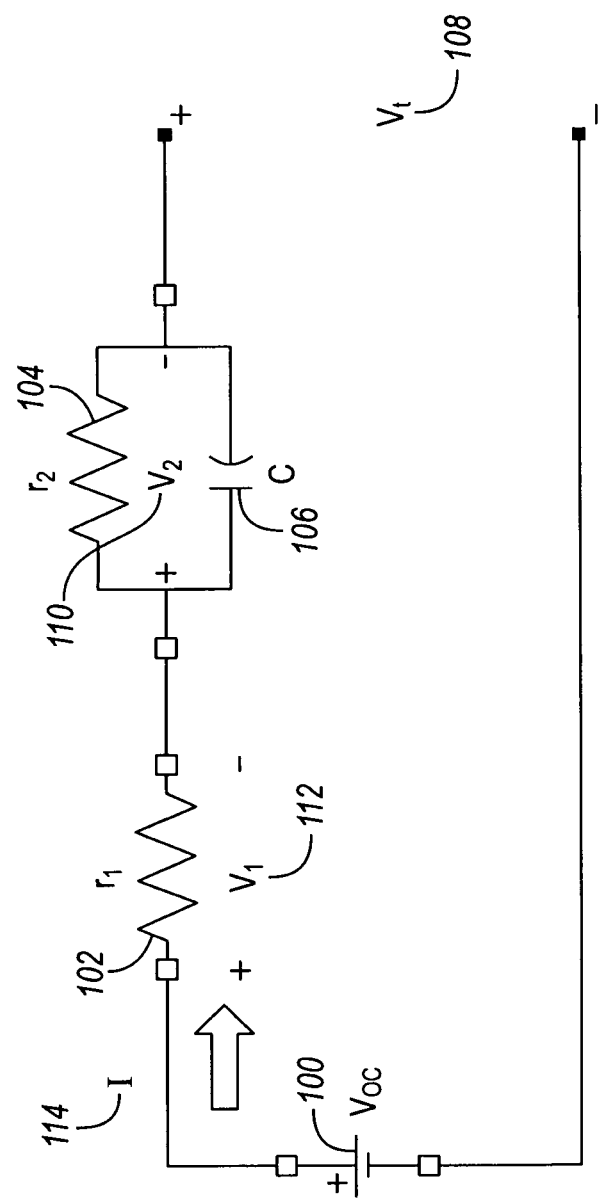
FIG. 3 is a diagram of an example battery cell equivalent circuit.

The battery cells 72 may be modeled in a variety of ways. For example, a battery cell may be modeled as an equivalent circuit. FIG. 3 shows one possible battery cell equivalent circuit model (ECM) which may be referred to as a simplified Randles circuit model. The battery cell 72 may be modeled as a voltage source 100, referred to as an open circuit voltage ($V_{oc}$), with associated impedance. The impedance may be comprised of one or more resistances (102 and 104) and a capacitance 106. The open-circuit voltage (OCV) 100 of the battery may be expressed as a function of a battery SOC and temperature. The model may include an internal resistance, $r_1$ 102, a charge transfer resistance, $r_2$ 104, and a double layer capacitance, C 106. The voltage $V_1$ 112 is the voltage drop across the internal resistance 102 due to current 114 flowing from the voltage source 100. The voltage $V_2$ 110 is the voltage drop across the parallel combination of $r_2$ 104 and C 106 due to current 114 flowing through the parallel combination. The terminal voltage ($V_t$) 108 is the voltage across the terminals of the battery. The value of the parameters $r_1$ 102, $r_2$ 104, and C 106 may depend on the cell design, temperature, and the battery chemistry. The traction battery 24 may be modeled using a similar model with aggregate impedance values derived from the battery cells 72.

The open-circuit voltage 100 may be used to determine the SOC of the battery. A relationship between battery SOC and the open-circuit voltage 100 exists such that the battery SOC may be determined if the open-circuit voltage 100 is known (e.g., SOC=f($V_{oc}$)). The relationship may be expressed as a plot or a table that may be stored in controller memory. The relationship may be derived from battery testing or battery manufacturer data.

During operation, the battery cells 72 may acquire a polarization caused by current flowing through the battery cells. The polarization effects may be modeled by the resistances 102, 104 and capacitance 106 of the equivalent circuit model. Because of the battery cell impedance, the terminal voltage, $V_t$ 108, may not be the same as the open-circuit voltage 100. The open-circuit voltage 100 is not readily measurable as only the terminal voltage 108 of the battery cell is accessible for measurement. When no current 114 is flowing for a sufficiently long period of time, the terminal voltage 108 may be the same as the open-circuit voltage 100. The voltages may be equalized after a sufficiently long period of time to allow the internal dynamics of the battery to reach a steady state. Note that after a sufficient settling time with no current flowing through the battery, the terminal voltage 108 and the open-circuit voltage 100 may be nearly equal. One technique of estimating the open-circuit voltage 100 is to wait a sufficient period of time after a battery rest period before measuring the terminal voltage 108 to ensure that the voltages are close.

Figure 4:
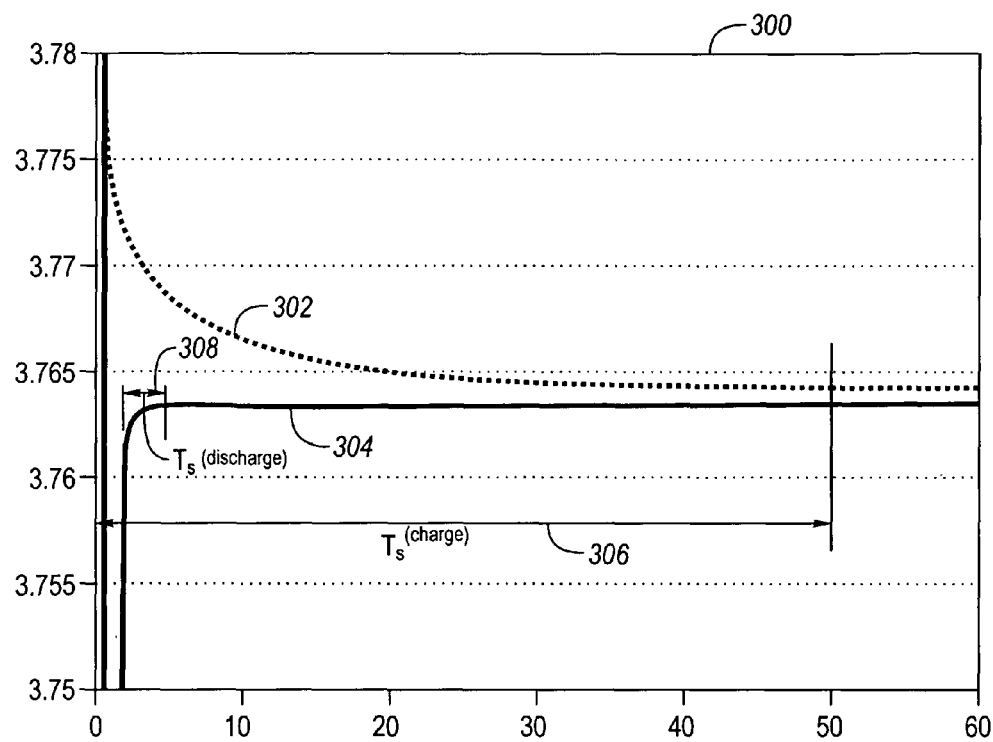
FIG. 4 is a plot of battery voltage settling time after a period of charging with and without a discharge pulse.

FIG. 4 shows a plot 300 of representative voltage stabilization or relaxation times for a battery voltage after a relatively long period of charging and after a relatively short period of discharging. Curve 302 represents the response of the battery terminal voltage 108 after a relatively long charge cycle. That is, a charge voltage is applied to the battery for greater than a predetermined period of time prior to time zero and at time zero, charging is stopped (e.g., zero current). As shown in the plot, the post-charge settling time 306 is approximately fifty seconds. Curve 304 represents the battery terminal voltage 108 when applying a relatively short discharge pulse after the relatively long charge cycle. As shown in the plot, the post-discharge settling time 308, is reduced to approximately five seconds. Similar curves may be obtained after a relatively long period of discharging except that a relatively short charge pulse is applied after a relatively long discharge cycle. The relevant observation is that the open-circuit voltage 100 and the terminal voltage 108 may equalize in less time by reversing the current flow through the battery for a relatively short time. That is, reversing the current through the battery after a charge or discharge cycle causes the polarization effects within the battery dissipate in a shorter time. The voltage stabilization time may be reduced by applying a current pulse with the opposite polarity. After a relatively long period of flowing current to the battery (e.g., charging), drawing a relatively short pulse of current from the battery (e.g., discharging) can reduce the voltage relaxation time.

Some battery management systems may measure the terminal voltage 108 at system startup to ensure that the voltages are stabilized before the measurement. Such a system assumes that the system-off time is sufficient so that any dynamic voltages and currents in the traction battery 24 have settled. When the terminal voltage 108 and the open-circuit voltage 100 are equalized, measuring the terminal voltage 108 yields an accurate estimate of the open-circuit voltage 100. Assuming no current is flowing through the battery 24 at system startup, the terminal voltage 108 and the open-circuit voltage 100 may be approximately equal. This initial open-circuit voltage value may be used to initialize the battery SOC. During the remainder of the ignition cycle, the battery SOC may be updated using ampere-hour integration or other methods. As the battery is operated over time, errors may be accumulated by the ampere-hour integration which may lead to the battery SOC being inaccurate.

During operation of the vehicle 12 the traction battery 24 may alternate between periods of charging and discharging making it difficult to accurately measure the open-circuit voltage 100 by measuring the terminal voltage 108. During operation of the traction battery 24, the pack voltage or individual cell terminal voltages 108 may be measured but may not accurately reflect the open-circuit voltage 100. In order to obtain an accurate value of the open-circuit voltage 100, the battery terminal voltage 108 should be in a steady-state condition with no load applied. That is, the terminal voltage 108 should not be changing and no current 114 should be flowing through the battery 24. Due to internal impedance and polarization effects of the battery 24, it takes time for the terminal voltage 108 to settle to a steady-state value. This effect is especially present after extended time periods of charging or discharging of the battery 24 as discussed in relation to FIG. 4. Over relatively long charge or discharge cycles, the equivalent internal capacitance 106 of the battery 24 may become charged and hold the charge even after current flow is stopped. Over time, the charge may dissipate and the terminal voltage 108 may approach the open-circuit voltage 100.

Referring to equivalent circuit model of FIG. 3, during charging, the voltage $V_2$ 110 may change over time to a final polarization voltage that is negative. When charging is stopped (e.g., zero current condition), the voltage $V_2$ 110 may decay to zero at a rate depending on the capacitance 106 and resistance $r_2$ 104 of the cell. The time to decay to zero may be referred to as the battery relaxation time. The addition of an appropriate discharge current may cause the voltage $V_2$ 110 to decay to zero in less time. By reversing the current (e.g., apply a discharge current) after the charge cycle, the polarization voltage 110 may be reduced in a shorter period of time.

Similarly, during discharging, the voltage $V_2$ 110 may change over time to a final polarization voltage that is positive. When discharging is stopped (e.g., zero current condition), the voltage $V_2$ 110 may decay to zero at a rate depending on the capacitance 106 and resistance $r_2$ 104 of the cell. The addition of an appropriate charge current may allow the voltage $V_2$ 110 to decay to zero in less time. By reversing the current after the discharge cycle, the polarization voltage 110 may be reduced to zero in a shorter period of time.

The effect of actively dissipating the polarization voltage 110 is that the terminal voltage 108 and the open-circuit voltage 100 can be made nearly equal in less time. Under this condition, the measurement of the terminal voltage 108 becomes an accurate representation of the open-circuit voltage 100.

The battery SOC value may be improved if the open-circuit voltage 100 could be accurately measured more frequently during an ignition cycle. Due to the dynamic response of the battery 24, the terminal voltage 108 may not accurately represent the open-circuit voltage 100 at all times. Even commanding zero current through the battery 24, it may take some time for the terminal voltage 108 and the open-circuit voltage 100 to equalize. For example, while charging the battery 24 (flowing current 114 into the battery 24), it may take approximately fifty seconds for the terminal voltage 108 to accurately represent the open-circuit voltage 100. During vehicle operation, it may not be possible to command zero current through the battery 24 for such a period of time without impacting vehicle performance.

The battery management system may attempt to control charging and discharging of the battery in order to ensure that the open-circuit voltage 100 may be accurately measured. The battery management system may be configured to measure the terminal voltage 108 after a current reversing charge/discharge pulse. The battery management system may also be configured to cause a current pulse in order to measure the terminal voltage 108. The current pulse may be followed by a rest period to allow the terminal voltage 108 to settle to a steady-state value before the measurement. The current pulse may be further defined as a current pulse profile that details the duration and magnitude of the current pulse over the pulse interval. The controller 76 may generate the current pulse profile based on operating conditions of the battery 24. The desired effect of the current pulse is to remove the polarization in the battery. In some cases, the current pulse may reverse the polarization by a small amount that can be quickly dissipated.

When an open-circuit voltage 100 measurement is requested or desired, the battery management system may ensure that the terminal voltage 108 is measured a predetermined settling time after the charge/discharge cycle. The system may monitor the terminal voltage 108 along with the charging and discharging status. In the event of a request to measure the open-circuit voltage 100, the controller may ensure that a terminal voltage 108 measurement follows a current pulse that reverses the current through the battery. If the battery 24 is currently performing a discharge cycle, the controller 76 may command a charge pulse. If the battery 24 is currently performing a charge cycle, the controller 76 may command a discharge current pulse to cause a current to flow from the battery. The charge/discharge current pulse may be followed by a period of time in which the current is commanded to zero for a predetermined settling time. The controller 76 may then wait the predetermined settling time to measure the terminal voltage 108. At this time, the measured terminal voltage 108 may be equivalent to the open-circuit voltage 100.

An open-circuit voltage 100 measurement may be requested under a variety of conditions. In some configurations, the request may be made after a predetermined period of time between voltage measurements. In some configurations, the request may be made when an estimated SOC error is greater than a predetermined threshold. In some configurations, the request may be made when a battery SOC estimate is desired. Other conditions are possible and some configurations may utilize one or more of the conditions to request an open-circuit voltage 100 measurement.

If the battery controller 76 is currently performing a charge cycle, the controller 76 may interrupt the charge cycle and command the discharge current pulse. The discharge current pulse may be followed by a rest period of approximately zero current. The discharge current pulse may be applied and the terminal voltage 108 may be measured after the rest period. Note that the battery controller 76 may coordinate with the engine 18 and the electric machines 14 to ensure that appropriate power is available for propulsion and other subsystems. In addition, the battery controller 76 may command external loads 46 to receive the discharge energy from the battery 24. The discharge current pulse may be the result of command one or more of the external loads 46 to draw current from the traction battery 24. For example, a heater may be activated to draw current from the battery 24 for a predetermined time.

If the battery controller 76 is currently performing a discharge cycle, the controller 76 may interrupt the discharge cycle and command the charge current pulse. The charge current pulse may be followed by the rest period of approximately zero current. The battery controller 76 may coordinate with the engine 18 and the electric machines 14 to ensure that a charge current is provided to the traction battery 24.

Figure 5:
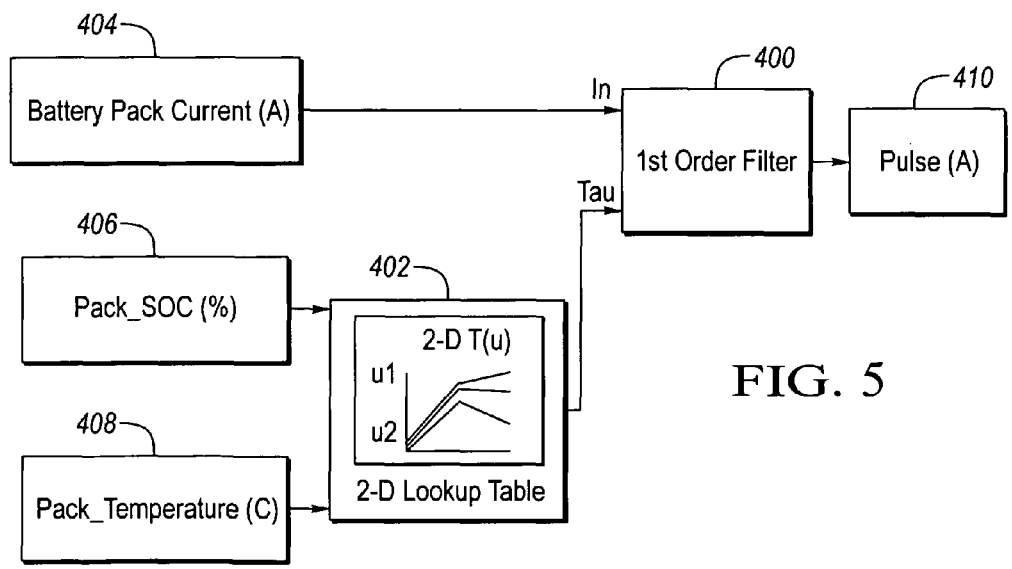
FIG. 5 is a block diagram of a filter for generating a current pulse.

FIG. 5 depicts a block diagram of one possible configuration for determining the magnitude of the current pulse. A filter 400 may be utilized such that the magnitude of the current pulse 410 is based on a filtered version of the battery current 404. The filter 400 may be a first-order low-pass filter having a filter-time constant (e.g., tau) that may be based on a first input 406 and a second input 408. The first input 406 may be the battery pack SOC. The second input may be the battery pack temperature. The filter-time constant may be derived from a lookup table 402 that inputs the first input 406 and the second input 408 and outputs the filter-time constant. The filter 400 may be configured such that over a period of time that is based on the filter-time constant, the output (e.g., current pulse magnitude 410) of the filter 400 approaches the input (e.g., battery current 404). The filter 400 may operate such that a longer duration of a constant battery current will produce a larger magnitude of the charge/discharge current pulse magnitude 410. The magnitude of the charge/discharge current pulse may approach the constant battery current magnitude if the duration is equivalent to several filter-time constants.

The principle of the filter operation is that the charge/discharge current pulse magnitude 410 is a function of a magnitude and duration of the battery current 404. A large battery current magnitude applied for a long duration will result in a greater charge/discharge pulse magnitude 410 than the same large battery current applied for a short duration.

The duration of the charge/discharge current pulse may be a fixed value. For example, the charge/discharge current pulse may be set to a predetermined time of one second. In some configurations, the charge/discharge current pulse duration may be a variable amount of time based on other parameters. The predetermined time may be based on battery parameters such as the resistance and equivalent capacitance. The magnitude and duration of the charge/discharge current pulse may be sufficient to fully or partially remove the cell polarization of the battery 24 so that the terminal voltage 108 will be close in value to the open-circuit voltage 100.

A practical application of the disclosed strategy may be when the vehicle is stopped (e.g., at a red light, a stop sign). The speed of the vehicle may be reduced by regenerative braking which charges the battery. When the vehicle comes to a stop, the battery controller may request an open-circuit voltage measurement. The battery controller may command a discharge pulse to reduce or remove the polarization effects from the battery charge cycle. The discharge pulse causes the current flow to be reversed for a sufficient period of time to reduce or remove the polarization of the cells. During a rest period of zero current, the terminal voltage may be measured. The open-circuit voltage may then be determined as the measured terminal voltage. The disclosed strategy allows for more frequent open-circuit voltage estimates during vehicle operation.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A battery management system comprising:
a controller programmed to, in response to an error of a state of charge of a battery being greater than a predetermined error magnitude in a presence of conditions indicative of a terminal voltage of the battery and the open-circuit voltage being different, apply a current pulse to reverse a current flow in the battery followed by a rest period such that cell polarization of the battery is reduced.

2. The battery management system of claim 1 wherein the conditions include charging the battery for greater than a predetermined time.

3. The battery management system of claim 1 wherein the conditions include discharging the battery for greater than a predetermined time.

4. The battery management system of claim 1 wherein the rest period is defined by a time period of approximately zero current.

5. The battery management system of claim 1 wherein a magnitude of the current pulse is based on a state of charge of the battery.

6. The battery management system of claim 1 wherein a magnitude of the current pulse is based on a temperature of the battery.

7. The battery management system of claim 1 wherein a magnitude of the current pulse is based on a magnitude of the current flow in the battery.

8. The battery management system of claim 1 wherein a duration of the current pulse is based on parameters of the battery.

9. The battery management system of claim 1 wherein the current pulse is a charge pulse when the current flow is a discharge current and the current pulse is a discharge pulse when the current flow is a charge current.

10. The battery management system of claim 1 wherein the controller is further programmed to apply the current pulse in response to an elapsed time from an immediately preceding application of the current pulse being greater than a predetermined period of time.

11. A vehicle comprising:
a battery including cells that acquire a cell polarization when a current flows through the battery such that an open-circuit voltage of the battery and a terminal voltage of the battery become different; and
a controller programmed to, in response to a request to measure the open-circuit voltage triggered by an error of a state of charge being greater than a predetermined error magnitude, apply a current pulse to reverse the current followed by a rest period to the battery to reduce the cell polarization.

12. The vehicle of claim 11 wherein the rest period is defined by a time period of approximately zero current.

13. The vehicle of claim 11 wherein a magnitude of the current pulse is based on one or more of a state of charge of the battery, a temperature of the battery, and a magnitude of the current flowing through the battery.

14. The vehicle of claim 11 wherein the current pulse is a charge current pulse when the current flows from the battery.

15. The vehicle of claim 11 wherein the current pulse is a discharge current pulse when the current flows to the battery.

16. The vehicle of claim 11 wherein the controller is further programmed to filter measured values of the current to generate a magnitude of the current pulse such that the magnitude increases as a current magnitude increases and increases as a current duration increases.

17. A method comprising:
reversing, by a controller, a current through a battery according to a current pulse profile that includes a rest period to reduce cell polarization of the battery in response to an error of a state of charge of the battery exceeding a predetermined magnitude; and
outputting, by the controller, a state of charge for the battery based on a measurement of a terminal voltage of the battery taken after the rest period.

18. The method of claim 17 wherein a magnitude associated with the current pulse profile is based on one or more of the state of charge, a temperature of the battery, and a magnitude of current flowing through the battery prior to reversing the current.

19. The method of claim 17 wherein a duration of the current pulse is based on parameters of the battery.

* * * * *